United States Patent [19]

Litteken

[11] Patent Number: 4,710,885
[45] Date of Patent: Dec. 1, 1987

[54] GENERATING FIGURES IN A DOCUMENT FORMATTER DIRECTLY FROM A DECLARATIVE TAG

[75] Inventor: Mark A. Litteken, Hurley, N.Y.

[73] Assignee: International Business Machines Corp., Armonk, N.Y.

[21] Appl. No.: 751,172

[22] Filed: Jul. 2, 1985

[51] Int. Cl.⁴ .................. G06F 15/62; G06F 15/20; B41B 19/00
[52] U.S. Cl. .................. 364/518; 364/300; 364/523; 400/63; 400/65
[58] Field of Search ........... 364/518, 519, 521, 523, 364/522, 200 MS File, 900 MS File, 300; 400/61, 62, 63, 65

[56] References Cited

U.S. PATENT DOCUMENTS

| | | | |
|---|---|---|---|
| 3,930,237 | 12/1975 | Villers | 364/300 |
| 4,464,730 | 8/1984 | Lawrence et al. | 364/900 |
| 4,539,653 | 9/1985 | Bartlett et al. | 364/900 |
| 4,575,813 | 3/1986 | Bartlett et al. | 364/523 |
| 4,594,674 | 6/1986 | Boulig et al. | 364/523 |
| 4,598,384 | 4/1986 | Shaw et al. | 364/900 |
| 4,622,641 | 11/1986 | Stephens | 364/521 |
| 4,633,430 | 12/1986 | Cooper | 364/900 |

OTHER PUBLICATIONS

Interactive Composition and Editing Facility—User's Guide, IBM Document No. SH20-0363-0, 1984.
Interactive Composition and Editing Facility—Installation and Style Definer's Guide; IBM Document No. SH20-0364-0, 1984.
Document Composition Facility Generalized Markup Language—Concepts and Design Guide, IBM Document No. SH-20-9188-1, 1/84.

*Primary Examiner*—Errol A. Krass
*Assistant Examiner*—Daniel W. Juffernbruch
*Attorney, Agent, or Firm*—C. Lamont Whitham; James H. Barksdale

[57] ABSTRACT

A method for generating a graphical figure in a textual markup language used for document composition. A special tag in the mark-up language calls a procedure. The procedure consists of drawing a series of contiguous rectangular boxes, of very small extent in at least one dimension, so as to appear as continuous lines representing the figure. Text can be associated with the tag and included within the figure. The size of the figure then depends on the extent of the text.

9 Claims, 5 Drawing Figures

GENERATING FIGURES IN A DOCUMENT FORMATTER DIRECTLY FROM A DECLARATIVE TAG

DESCRIPTION

1. Technical Field

The present invention relates generally to document composition. In particular, the invention relates to software systems which provide interactive support for authors of complex documents which combine text and graphics art. Typically, these documents have several illustrations on each page.

2. Background Art

Previously, creating these documents involved manually merging the text and illustrations by a "cut and paste" method to determine individual page layouts. Quite clearly this type of production is quite costly in terms of time and labor. In addition, revising such documents or maintaining multiple versions of a document in this way is difficult and expensive.

To solve these problems, an interactive document formatter program JANUS was developed which provided authors with immediate feedback and direct electronic control over page layouts. It permits the author to control placement of illustrations in text electronically and to review the finished pages immediately on a graphic display. The architecture of the JANUS program is described in a paper by D. D. Chamberlin, et al. entitled "JANUS: An Interactive Document Formatter Based on Declarative Text", *IBM Systems Journal*, Volume 21, Number 3, 1982, at page 250. In the JANUS system, an author may mark up his document using "tags", a high level of notation which identifies the various parts of the document, such as paragraphs and chapter headings, numbered items and footnotes. Each tagged items is formatted according to the instructions contained in a separate procedure specific to that tag. Such a system provides the benefit of a high level markup language in which complex formatting procedures are invoked by simple tags and are uniform because their appearance is controlled by the tag procedure rather than by an individual writer. Furthermore, an entire set of documents can be uniformly reformatted by revising the tag procedure without revising the markup in the individual documents.

More recently a software system called the Interactive Composition and Editing Facility (ICEF), which is based on the JANUS system, has been made commercially available. The ICEF program allows a document to contain mixtures of text in various fonts, graphics, scanned images, tables and mathematical formulae. Pages containing all such text may be displayed on the user's terminal and changes applied without going off line. At the conclusion of preparing the document, it may be printed. The ICEF program operates on an IBM System 370 under the VM/CMS operating system and the document is printed out by a high resolution printer such as the IBM 4250 printer.

The document may be displayed on a two-screen work station such as the IBM 3277 display terminal and a Tektronix 618 storage tube which provides a full page size, all-points-addressable screen for display of the formatted document. The JANUS system allows various kinds of figures to be placed in the document and thereafter printed by preparing the figure in a specified file format using an image or a graphic editor, using a command to prepare the figure to be displayed and printed and using the name of the file as an attribute for some tag that calls for an imbedded image or graphic drawing. This technique, while quite useful, has the disadvantage of requiring a separate graphic file to produce the image at the desired location on the document. The graphic file needs to be separately generated and requires a relatively large amount of storage for the graphic.

The ICEF program is described in the following publications which are available from an IBM branch office: "Interactive Composition and Editing Facility—User's Guide", IBM document no. SH20-0363-0, and "Interactive Composition and Editing Facility—Installation and Style Definer's Guide", IBM document no. SH20-0364-0.

ICEF can format documents for printing and is an interactive system which allows an author to see immediately what his formatted pages will look like on the display, although ICEF may also be used with the traditional "batch" approach to formatting.

ICEF, like JANUS, allows the author to "mark up" the document with high level "tags" in a notation known as the "generalized markup language" (GML). GML tags identify the various parts of the document such as headings, figures, and footnotes. The program then formats the pages of the document based on this understanding of the various document parts. The ICEF program also allows an author to embed images and graphics in the document which are shown on the display as the document is formatted and which are printed on the final output pages.

Both the JANUS and the ICEF program systems allow various kinds of figures to be placed in the document and thereafter printed. The figure is generated by a graphic editor in a specified format. The figure is prepared for display and printing by using a command which is not a tag. Finally, at the place in the markup where the figure is to be inserted, a tag is included in the markup language. This tag causes the figure to be embedded in the formatted output. The name of the figure would be an attribute of that tag. This technique, while quite useful, has the disadvantage of requiring a separate graphic file to produce the image at the desired location on the document.

A similar problem is addressed by Lemelson in U.S. Pat. No. 3,872,462. Lemelson discloses electronically generating a blank form, i.e. certain entries not filled out, on a CRT and then keying in the missing entries. Lemelson does not disclose the use of graphics however. Fessel in U.S. Pat. No. 4,403,301 discloses an apparatus similar to that of Lemelson.

SUMMARY OF THE INVENTION

It is an object of the invention to provide formatting of graphics in a document without resorting to a manual "cut and paste" method.

It is another object of my invention to improve and expand the function of interactive document formatters.

It is a further object of my invention to make it unnecessary for graphics such as curves to be stored in a file while is separate from the mark up file of such formatters.

It is yet another object of my invention to improve the capability of automatic text formatter programs which recognize some types of generalized markup language.

This invention provides the generation of curves and other figures from within a generalized markup language tag and placement of them in formatted text output by mathematically calculating the position of some number of points on the curve or other figure and placing a mark in the formatted output for each point. In this way, the curves or other figures are generated directly from the tag. By using this invention, separate graphic files are not necessary. In this invention, a neg tag is created which will be recognized by the formatter program in which the language for implementing the tags provides a way to generate a mark of an arbitrary size at an arbitrary location in the formatted output.

BRIEF DESCRIPTION OF THE DRAWINGS

The foregoing and other objects, aspects and advantages of my invention will be better understood from the following detailed description with reference to the drawings in which.

DETAILED DESCRIPTION OF THE INVENTION

As noted above, my invention is useful for any automatic text formatting program which recognizes a generalized markup language, is capable of creating new tags which will be recognized by the formatter and which provides a way to generate a mark of an arbitrary size in an arbitrary location in the formatter output. In the following description I will specifically refer to the Interactive Composition and Editing Facility (ICEF) program which is a commercially available program offering from the IBM Corporation.

The ICEF user marks up his document using a set of high-level tags which itentify the various parts of the document. The tags are interpreted according to a style definition that controls the appearance of each part of the document. A document may contain various parts such as headings, paragraphs, lists, footnotes, tables and mathematical formulae. A standard style definition called GDOC also provides tag that may be used to generate a table of contents, list of illustrations, index and bibliography. The ICEF program also provides a means whereby a user can modify parts of a style definition or create new style definitions of his own.

The advantage of marking up documents with high level tags allow a single descriptive tag such as "footnote" to take the place of dozens of lower level commands to control the appearance of a footnote, and tags enable the formatting system to understand the structure of the document. The user can use this information to make the job of editing the document easier. A complete list of tags used in the ICEF program is shown in the previously cited "Interactive Composition and Editing Facility: User's Guide".

The ICEF notation for marking up a document is a subset of the proposed ANSI/ISO standard generalized markup language (GML). The proposed standard is described in a docuemnt entitled "International and American National Standard for Computer Languages for the Processing of Text: Standard Generalized Markup Language", Dec. 1, 1982, cited in footnote 4 on page 15 of the previously cited "Interactive Composition and Editing Facility: User's Guide". In this language, each structural part or "element" of a document is identified by a "tag" which begins with a colon (:).

The particular style which will be used throughout this specification is the GDOC (general document) style which is intended for use with general documents. The GDOC style definition of ICEF is modeled on a "starter set" of tags which are listed, along with their functions and attributes, in the above-referenced "Interactive Composition and Editing Facility: User's Guide".

One of the commands of the ICEF language is the BOX command, as described in the User's Guide at pages 33-40. The BOX command is central to the formatting of the document and the generated box is usually invisible in the final output. However, this command allows a Framed option which makes the boundaries of the box visible in the final output. The Framed Box Command thus enables the final document to contain outlining boxes, perhaps with included text. Such boxes are considered very useful for emphasizing important points and for graphically organizing a document for ease of understanding.

However, a box is only a limited graphical tool and it is felt that more elaborate graphics should be made available.

One very useful graphic, particularly for the computer and word processing industry, would be a graphic that represents the screen of a terminal or CRT. It is typical in instruction manuals in the industry to present a few paragraphs of text regarding data entry and then to illustrate a resultant display on the CRT screen. A visible box, generated by the Framed BOX command in the ICEF language, could be used to represent the screen. However, a CRT screen almost invariably has rounded corners so that the box representation does not immediately elicit the desired recognition. Furthermore, a box representing a CRT screen can be confused with boxes intended only to highlight important points. In user's manuals, any possible confusion should be minimized.

At the present time, the ICEF language does not provide the graphic for a screen. The principal embodiment of the invention to be described below will involve a tag for generating a screen graphic, that is, a box with rounded corners. However, it is to be understood that the invention is not so limited to the generation of rounded boxes, but can be extended to more general non-rectangular graphics, a few of which will be briefly described. The described embodiment of the invention uses the presently available ICEF language to allow the use of a tag :SCREEN that will eventually generate a screen graphic, perhaps enclosing some text, in the formatted output.

Figure 1:
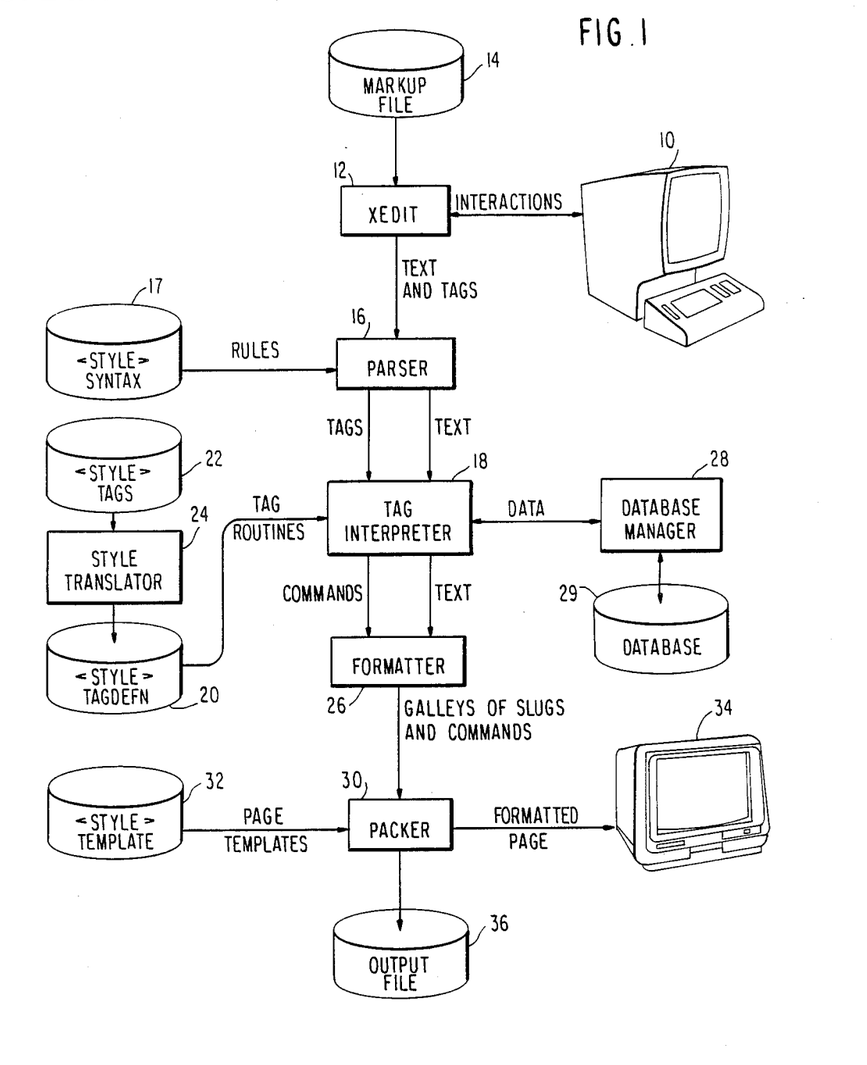
FIG. 1 is a block diagram of the ICEF architecture.

For an understanding of the invention, it is useful to understand the ICEF architecture, illustrated in FIG. 1. During an ICEF session, the user at a terminal 10 has available the regular editing commands of XEDIT 12 as well as some specialized ICEF commands, implemented as XEDIT macros. The user can call up lines from the user's markup file 14, perhaps revise them, and send them to a parser 16. The parser 16 using rules from a syntax file 17 for the current style recognizes tags and finds a possible textual passage associated with each tag. For each tag, the parser calls a tag interpreter 18, which interprets the tag using a tag routine found in a TAG- DEFN file 20. The TAGDEFN file 20 contains an efficient representation of the tag routine provided by the style definer in a TAGS file 22 as translated by a style translator 24. While interpreting a given tag, the tag interpreter 18 may make calls to a formatter 26 and a data base manager 28. The data base manager can temporarily store in a database 29 information about headings, figures and the like for use elsewhere in the document. The formatter 26 accepts commands from the tag interpreter 18 and text from the parser 16 to produce a long column of formatted text called a galley. This galley is sent to a packer 30, which cuts up the galley and packs it onto pages according to page templates contained in a TEMPLATE file 32. The resultant formatted pages are displayed on a graphic display 34 and saved in an output file 36.

The present invention uses the tag definition language of ICEF to produce a new tag :SCREEN in the TAGS file 22. The tag :SCREEN can be defined either by the style editor or could be included as a predefined tag in an expanded version of ICEF. A tag can be inserted into the edited markup file 14 by the user at the terminal 10. Thereafter, the tag :SCREEN is recognized by the tag interpreter 18 which invokes the :SCREEN tag definition from the TAGDEFN file 20. The result is a screen graphic appearing on the formatted page displayed on the CRT display 34 and preserved in digital form in the output file 36.

Figure 2:
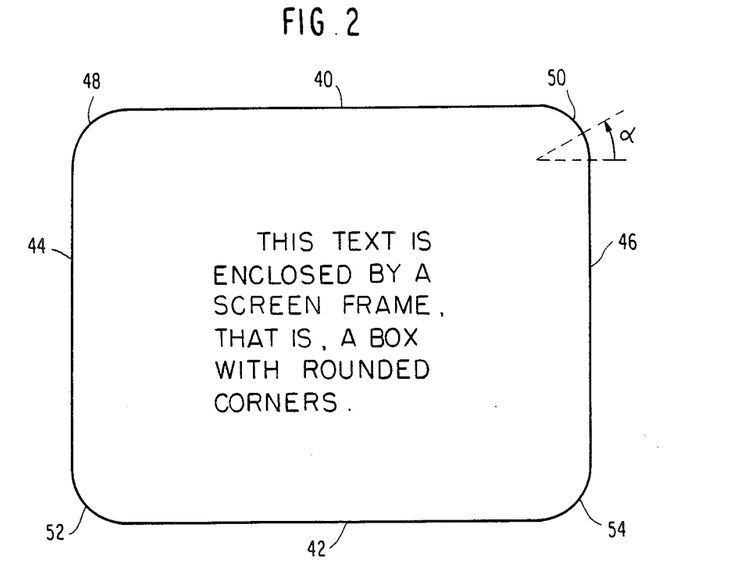
FIG. 2 is a sample document, generated by the invention, which incorporates a rectangle with rounded corners in the formatted output.

The invention provides for the formatted display shown in FIG. 2. The screen outline consists of two horizontal straight lines 40 and 42 and two vertical straight lines 44 and 46. The screen frame further consists of four 90° rounded corners 48, 50, 52 and 54. The :SCREEN tag is written to simulate the screen frame with a series of Framed BOX commands, each with the Frame option active so that the resultant boxes are visible. The two vertical lines 44 and 46 consist of tall slender boxes, while the horizontal lines 40 and 42 consist of boxes that are wide and shallow. The corners 48-54 each consist of a sequence of very small boxes so close together that they appear as continuous curves. Of course, all the lines 40-54 are positioned so as to form a continuous screen frame.

The tag definition contained within the TAGDEFN file 20 is an executable procedure. A flow chart for this procedure is given in FIGS. 3 and 4, and is executed whenever the tag :SCREEN is encountered by the tag interpreter 18.

Figure 3:
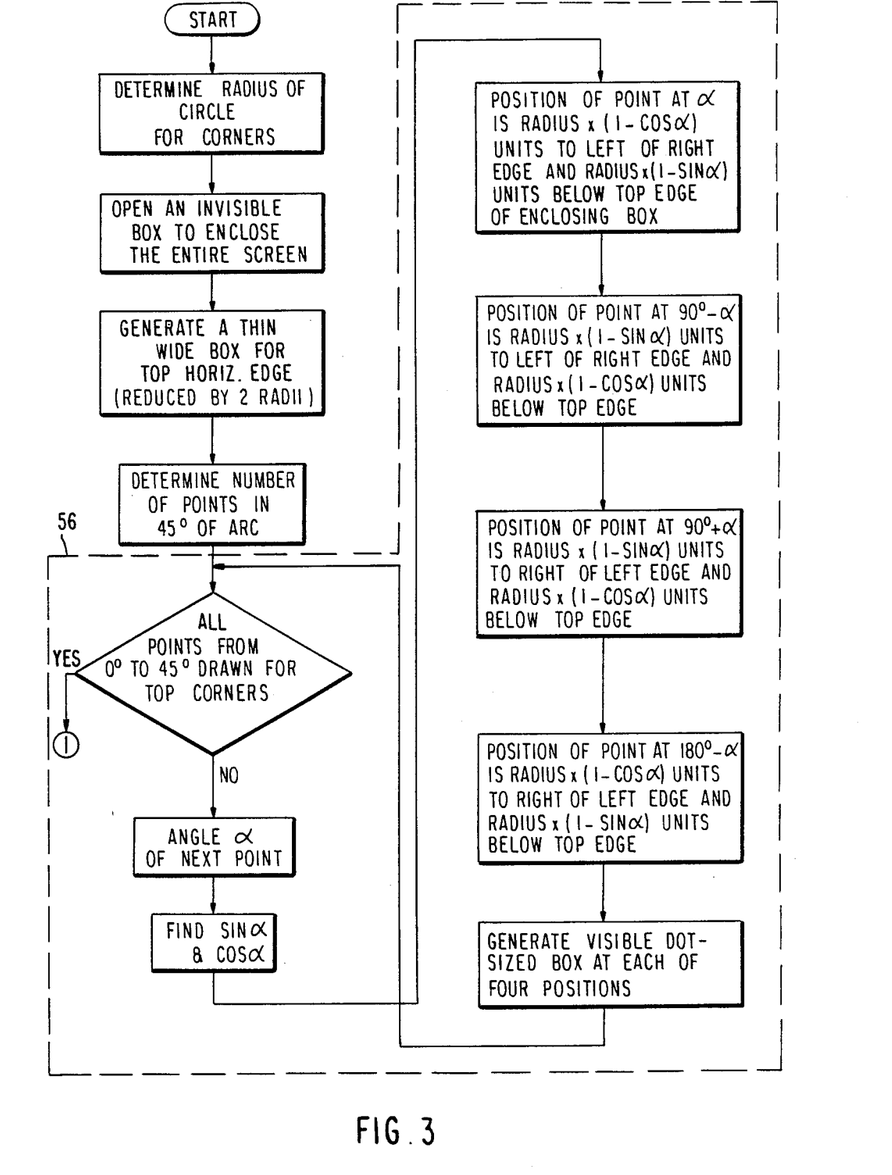
FIGS. 3 and 4 illustrate a flow diagram for the procedure of the invention.
Figure 4:
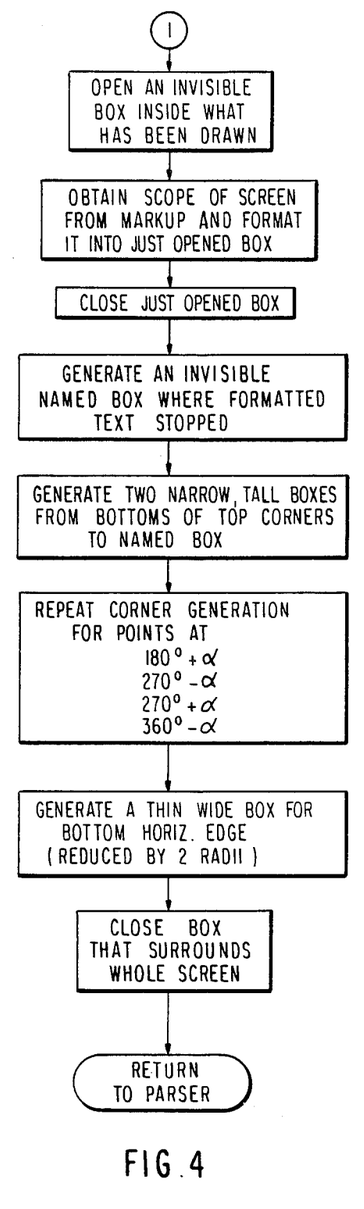

The radius of the circles for the four corners 48-54 is first determined. This radius can be either a number of units fixed in the procedure or can be produced by the parameters resulting from the styling of the tags. Then an invisible box is opened to enclose the entire screen. This is a rectangular box resultant from the BOX command. The left and right sides of the box are generated from the parameters of the chosen style. For instance, the width of the box is dependent upon the page width and whether the page is divided into columns and the width of side margins. The height of the box is determined later when the box is closed. The box thus opened is never made visible but simply determines the extent of the final display. Then a thin wide box is generated for the top horizontal edge 40 of the screen frame. This thin wide box is made visible by the Frame option. The height of the box is chosen such that the two horizontal edges appear to the viewer of the output to merge into a single line. The width of the box is the width of the enclosing box of the previous step reduced by two radii to account for the top edge 40 only extending to the beginnings of the two top corners 48 and 50.

Then the number of points in 45° of arc for any of the corners 48-52 is determined. This number is determined so as to provide the appearance of a continuously varying curved line and thus will depend upon the value of the radius and the size of the very small boxes generated later to form the curved corners 48-52. The number of points can be either fixed within the procedure or made dependent upon style parameters.

Thereafter, a series 56 of steps is entered that generates seemingly continuous curves from a number of boxes to form the two upper curved corners 48 and 50. The series 56 is a loop of steps. For each pass through the loop, boxes are placed at four symmetric points on the two upper corners 48 and 50. First, a test is made to determine if all the points from 0° to 45° have been drawn for the top corners 48 and 50, that is, whether the loop has been passed through as many times as the number of points determined in the previous step. If the result of the test is true, then execution passes outside of the series of steps 56, as will be described later. If, however, there are points remaining to be drawn, then the angle $\alpha$ of the next point is calculated. This angle $\alpha$ will, of course, depend upon the number of points in the 45° of arc and the number of times the series 56 of steps has been executed. Once the angle $\alpha$ has been determined, then the trigonometric function $\sin(\alpha)$ and $\cos(\alpha)$ are calculated. These trigonometric calculations are included as separate steps because the ICEF, language, being non-scientific, does not provide trigonometric functions and the procedure must include a method of calculating these functions, such as power series expansion.

The positions of 4 points in the upper two corners 48 and 50 are then determined. The position of the point at the angle $\alpha$ from the bottom-most end of the arc of the right upper corner 50 is located at $(1-\cos\alpha)$ times the radius of the 4 corners 48-54 to the left of the right edge of the invisible box enclosing the screen. This invisible right edge traces the right edge 46 of the screen except in the vicinity of the two right corners 50 and 54. The point is located vertically $(1-\sin\alpha)$ times the corner radius below the top edge of the invisible enclosing box. This top edge coincides with the top edge 40 of the screen except in the vicinity are expressed in the same units as the radius.

Then the position of the point at $90°-\alpha$ in the upper right corner 50 is determined. This second point is symmetric to the first point about the 45° bi-sector of the upper right corner 50. The position is $(1-\sin\alpha)$ times the radius to the left of the right edge of the enclosing box and $(1-\cos\alpha)$ times the radius below the top edge of the enclosing box.

The two more points on the upper left corner 48 are determined. The position of the point at $90°+\alpha$ is $(1-\sin\alpha)$ times the radius to the right of the left edge of the enclosing box and $(1-\cos\alpha)$ times the radius below the top edge of the enclosing box. The left edge of the enclosing box coincides with the left side 44 of the screen except in the vicinity of the two left corners 48 and 52. The position of the point at the angle $180°-\alpha$ is $(1-\cos\alpha)$ times the radius to the right of the left edge and $(1-\sin\alpha)$ times the radius below the top edge.

Then at the edge of the four positions so determined, a dot-sized visible box is generated by the BOX command with the Frame option on. The four boxes are sized so that they appear at point. However, there are a sufficient number of finite sized boxes that they provide the appearance to the viewer of a continuous line. Once the four boxes have been generated, execution returns to the beginning of the series 56 of steps. In this way, the two upper corners 48 and 50 are formed and meet the upper side 40 of the screen.

Then an invisible box is opened inside and below what has been drawn. This box opening does not yet define the bottom of the open box. The top of the opened box can conveniently be defined as being a radius of the corners 48–54 below the top edge 40 of the screen. The left edge of the opened box could conveniently be placed a fixed distance to the right of the left edge 44 and the right edge of the opened box the same fixed distance to the left of the right edge 46 of the screen.

Then the scope of the screen is obtained from the markup file 14 and this is formatted into the just opened box. This scope is typically dictated by the text which is to be enclosed within the screen and is included as alphanumeric characters as parameters of the :SCREEN tag entered by the operator. An example of such text and its format is shown in FIG. 2 enclosed by the frame of the screen. With the text entered into the opened box, the box is then closed. The height of the closed box is dependent upon the amount of text which had been formatted into the box. Thus, the closed box will be used to determine the height of the screen.

Then an invisible named box is generated. The box will be inserted below the just closed box so that its top identifies the bottom of the formatted text. The named box is immediately closed so that its height is infinitely small. This box is used only to obtain positioning information. Then two narrow, tall boxes are generated and made visible. These boxes extend respectively from the bottoms of the two top corners 48 and 50, respectively, to the top or bottom of the named box. They are narrow enough to appear as though their respective right and left sides merge and thus form the right and left edges 46 and 44 of the screen frame.

Then the two lower corners 52 and 54 are generated similarly to the upper corners 48 and 50 of the upper corners 48 and 50 by generating points at $180° + \alpha$, $270° - \alpha$, $270° + \alpha$ and $360° - \alpha$. A looped series of steps is executed similarly to the series 56. Of course, the position equations are somewhat modified, as should be obvious by the geometric configuration, and the vertical positions are measured relative to the top or bottom of the named box that has been determined by the bottom of the formatted text.

Then, a thin, wide, visible box is generated to form the bottom edge 42. This box is displaced vertically downward one radius from the top of the named box and has its horizontal length reduced by two radii such that the box touches the lower ends of the two lower corners 52 and 54.

Finally, the invisible box that was opened at the beginning of the procedure is closed. This box will barely include the lower edge 42 of this screen frame. Execution then returns to the parser.

A software program, written in the tag definition language of ICEF that will execute the above procedure, is presented in Appendix A. The line ".imbed rtos" in the SCR TAGS file causes the contents of the RTOS TAGS file, included in Appendix B, to be included by the style compiler at that point. It works as though the code in RTOS TAGS has been physically located where the "imbed" appears. The tag :SCR is a separate preparatory tag that is executed to initialize various parameters in the editing. The software presented in Appendix A defines a complete style that was used in the development of the :SCREEN tag. The intention is to incorporate the tag :SCREEN into the general GDOC style, in which case the initializing is already provided so that the :SCR tag is not then necessary.

Figure 5:
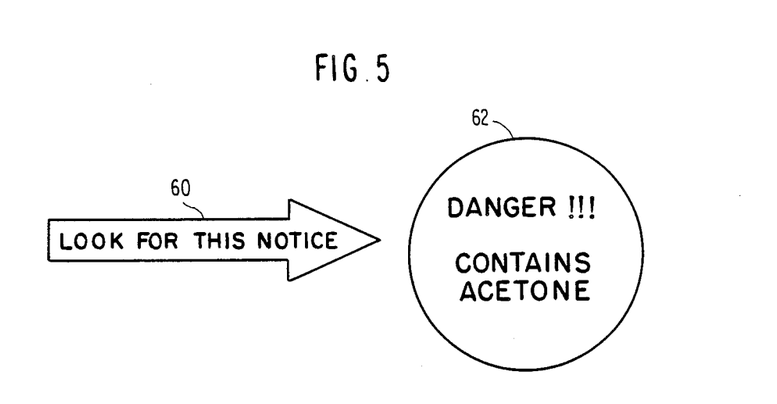
FIG. 5 illustrates an arrow and a circle in the formatted output.

Although the principal embodiment has involved the graphic for a screen, it is to be appreciated that the invention can be easily extended to other geometric but non-rectangular graphics. For example, software has been written, similar to the :SCREEN tag for an arrow 60 and a circle 62, as shown in FIG. 5. This figure shows how two graphics can be beneficially combined, one primarily intended for a teaching tool and the other for a representation of a physical object. It should be noted that the software can easily include the option of rotating the arrow 60. The software required for both these graphics can easily be written by a programmer skilled in the ICEF language, following the example for the :SCREEN tag.

The procedure of Appendix A can be called from the mark-up language by software presented in Appendix C. Calls for several different tags are presented therein. The call of interest is ":screen". It is of course noted that capitalization is not required and that the complete call is ":screen. This text is the scope of the screen tag. It should etc." The text following the period after "screen" and up to the next colon-delimited tag is the text which will be included within the screen. The placement of the screen in the document depends on the location of the screen tag in the markup.

Also included in Appendix C are calls for the circle graphic and the arrow graphic as well as a combined arrow and circle.

APPENDIX A

```
.imbed rtos tag scr;
begin
command ('TEMPLATE  both=thepage');
command ('NEWPAGE');
command ('GALLEY NAME=THEGAL COLWIDTH=5I pagewidth=5I');
parse();
end;

tag screen;
var cradius: string(15);  (* radius of rounded corners *)
var rradius: real;        (* Same as CRADIUS, but in real format. *)
var pieces: integer;      (* number of boxes to draw in 45 degrees*)
```

```
var piover4: real;        (* radian measure PI/4.0 = 45 degrees  *)
var piover2: real;        (* radian measure PI/2.0 = 90 degrees  *)
var incr: real;           (* radian increment between the points *)
var thispoint: integer;   (* the number of the current point     *)
var octant: integer;      (* the current octant of circle        *)
var x: real;              (* angle to find sin & cos of          *)
var x2: real;             (* x**2                                *)
var cc2: real;       (* for the cos, coefficient on the x**2 term *)
var cc4: real;       (* for the cos, coefficient on the x**4 term *)
var cc6: real;       (* for the cos, coefficient on the x**6 term *)
var cc8: real;       (* for the cos, coefficient on the x**7 term *)
var sc3: real;       (* for the sin, coefficient on the x**3 term *)
var sc5: real;       (* for the sin, coefficient on the x**5 term *)
var sc7: real;       (* for the sin, coefficient on the x**7 term *)
var sc9: real;       (* for the sin, coefficient on the x**9 term *)
var xcoord: real;    (*                                           *)
var ycoord: real;    (*                                           *)
var hdist: string(15);   (* horiz distance from parent to one of  *)
                         (* the teeny-tiny boxes                  *)
var vdist: string(15);   (* vert distance from parent to one of   *)
                         (* the teeny-tiny boxes                  *)
var here : string(25);   (*                                       *)
var mcos : real;         (* cos of the 1st-octant angle           *)
var msin : real;         (* sin of the 1st-octant angle           *)
var swidth: string(15);  (* screen width                          *)
var sface:  string(25);  (* type face to use inside screen        *)
var ssize:  string(15);  (* size of font to use inside screen     *)
var sconcat: string(5);  (* whether to concat lines or not        *)
var measure: integer;    (* used only to call checkm routine      *)
var rc: integer;         (* return code from routines             *)

begin
say ('Starting a screen tag.');
rradius := 0.5;      (* radius of the rounded corners *)
cradius := rtos(rradius, 5) || 'I';
say ('rradius = ' || cradius);
pieces := 50;

(* Do a box to enclose the whole screen *)
(* Find out what the width of the screen should be.*)

swidth := trim(ltrim(argvalup('width')));
case swidth of
    '':        swidth := '*';
    'PAGE':    begin end;
    'COLUMN':  begin end;
    'COL':     swidth := 'COLUMN';
    otherwise
       begin
       checkm(swidth, measure, rc);
       if rc -= 0
       then begin
            error ('The "width" attribute on the "screen" tag is ' ||
                   'not a measure.');
            error ('    A default screen width has been used.');
            swidth := '*';
            end
       else if measure < 36000
            then error ('The "width" attribute on the "screen" tag is ' 
                        || 'less than a half inch.')
            else swidth := swidth || ' centered';
       end;   (* of OTHERWISE *)
end;   (* of CASE *)
command ('BOX atomic width=' || swidth); (* This box encloses screen *)

(* This box is the top line of the screen shape *)
command ('BOX framed top=*    height=1' ||
         ' left=*+' || cradius || ' right=*-' || cradius);
command ('ENDBOX');
```

```
(*****************************************************************)
(* Put in the upper left and right rounded corners of screen. *)
(*****************************************************************)
(* Get the values of some constants we will need. *)
piover4 := 0.78539816;      (* pi/4.0 = 45 degrees *)
piover2 := piover4 * 2.0; (* pi/2.0 = 90 degrees *)
incr := piover4/float(pieces);    (* Radian angle between the points *)

cc2 := -0.5;                (* Coefficients of series for cos. *)
cc4 :=  1.0 /     24.0;     (* The number is the degree of assoc term. *)
cc6 := -1.0 /    720.0;
cc8 :=  1.0 /  40320.0;

sc3 := -1.0 /      6.0;     (* Coefficients of series for sin. *)
sc5 :=  1.0 /    120.0;     (* The number is the degree of assoc term. *)
sc7 := -1.0 /   5040.0;
sc9 :=  1.0 / 362880.0;

(* Find the location for each of the teeny-tiny empty framed boxes  *)
(* which will be used to draw the curves. The formulae for sin & cos *)
(* are Maclaurin's series which have been factored according to     *)
(* Horner's rule. When compared to the corresponding Pascal built-in *)
(* functions, they should be good to about the 7th or 8th decimal   *)
(* place.                                                            *)
for thispoint := 0 to pieces do (* for every pt. between 0 & 45 degree*)
   begin
   x := float(thispoint) * incr;   (* Angle of this point in radians *)
   x2 := x * x;                    (* Square it for use in series *)

(* Get 1st octant sin & cos *)
mcos      := (x2*(x2*(x2*(cc8*x2+cc6)+cc4)+cc2)) + 1.0;
msin      := x*(x2*(x2*(x2*((sc9*x2)+sc7)+sc5)+sc3)+1.0);

(* Now draw the 4 teeny-tiny boxes (one for each octant). *)
for octant := 1 to 4 do
   begin
   (* Find x-coord of box location, assuming center of cirlce  *)
   (* is at the origin. Then find the horizontal distance of   *)
   (* that location from the left/right edge of the parent box. *)
   (* Do similar thing for y-coord and vertical distance from  *)
   (* top of parent box. Then convert distance values to strings*)
   (* for use in BOX command & draw the teeny-tiny box.        *)
   case octant of
      1: begin
         xcoord := rradius * mcos;
         hdist := rtos(rradius - xcoord, 5) || 'I';
         here := 'right=*-' || hdist;
         ycoord := rradius * msin;
         end;
      2: begin
         xcoord := rradius * msin;
         hdist := rtos(rradius - xcoord, 5) || 'I';
         here := 'right=*-' || hdist;
         ycoord := rradius * mcos;
         end;
      3: begin
         xcoord := rradius * msin;
         hdist := rtos(rradius - xcoord, 5) || 'I';
         here := 'left =*+' || hdist;
         ycoord := rradius * mcos;
         end;
      4: begin
         xcoord := rradius * mcos;
         hdist := rtos(rradius - xcoord, 5) || 'I';
         here := 'left =*+' || hdist;
         ycoord := rradius * msin;
         end;
   end;   (* of 'case octant of' *)
   vdist := '+' || rtos(rradius - ycoord, 5) || 'I';
```

```
         command ('BOX framed top=*' || vdist || ' height=900 ' || here
                                             || ' width=900');
         command ('ENDBOX');
       end;    (* of 'for octant := 1 to 4' *)
   end;    (* of 'for thispoint := 1 to pieces' *)

command ('BOX top=*+' || cradius || ' left=*+2em right=*-2em');
sface   := trim(ltrim(argvalup('face')));
ssize   := trim(ltrim(argvalup('size')));
sconcat := trim(ltrim(argvalup('concat')));
command ('FORMAT face=' || sface || ' size=' || ssize ||
         ' concat=' || sconcat);
parse();   (* Put scope of the tag inside the screen *)
command ('ENDBOX');

(* Draw in the left & right side lines *)
(* First, make a box with a name so we can draw down to it. *)
command ('BOX name=scrbot');
command ('ENDBOX');
(* Draw left sideline *)
command ('BOX framed top=*+' || cradius || ' bottom=bottom(scrbot)'
             || ' left=* width=1');
command ('ENDBOX');

(* Draw right sideline *)
command ('BOX framed top=*+' || cradius || ' bottom=bottom(scrbot)'
             || ' right=*-900 width=1');
command ('ENDBOX');

(* Now draw the lower left and right rounded corners. Method is simi- *)
(* lar to that used to draw the upper left and right ones.            *)
for thispoint := 0 to pieces do  (* for every pt. between 0 & 45 degree*)
   begin
   x := float(thispoint) * incr;   (* Angle of this point in radians *)
   x2 := x * x;                    (* Square it for use in series *)

(* Get 1st octant sin & cos *)
   mcos    := (x2*(x2*(x2*(cc8*x2+cc6)+cc4)+cc2)) + 1.0;
   msin    := x*(x2*(x2*(x2*((sc9*x2)+sc7)+sc5)+sc3)+1.0);

(* Now draw the 4 teeny-tiny boxes (one for each octant). *)
   for octant := 5 to 8 do
      begin
      (* Find x-coord of box location, assuming center of cirlce  *)
      (* is at the origin. Then find the horizontal distance of   *)
      (* that location from the left/right edge of the parent box.*)
      (* Do similar thing for y-coord and vertical distance from  *)
      (* bottom of parent. Then convert distance values to strings*)
      (* for use in BOX command & draw the teeny-tiny box.        *)
      case octant of
         5: begin
            xcoord := rradius * mcos;
            hdist := rtos(rradius - xcoord, 5) || 'I';
            here := 'left=*+' || hdist;
            ycoord := rradius * msin;
            end;
         6: begin
            xcoord := rradius * msin;
            hdist := rtos(rradius - xcoord, 5) || 'I';
            here := 'left=*+' || hdist;
            ycoord := rradius * mcos;
            end;
         7: begin
            xcoord := rradius * msin;
            hdist := rtos(rradius - xcoord, 5) || 'I';
            here := 'right =*-' || hdist;
            ycoord := rradius * mcos;
            end;
```

```
      8: begin
           xcoord := rradius * mcos;
           hdist := rtos(rradius - xcoord, 5) || 'I';
           here := 'right =*-' || hdist;
           ycoord := rradius * msin;
         end;
    end;    (* of 'case octant of' *)
    vdist := '+' || rtos(             ycoord, 5) || 'I';

command ('BOX framed top=bottom(scrbot) ' || vdist
                    || ' height=900 ' || here || ' width=900');
    command ('ENDBOX');
    end;  (* of 'for octant := 5 to 8' *)
  end;  (* of 'for thispoint := 1 to pieces' *)

(* This box is the bottom line of the screen shape *)
command ('BOX framed top=bottom(scrbot)+' || cradius   || ' height=1' ||
              ' left=*+' || cradius || ' right=*-' || cradius);
command ('ENDBOX');

command ('ENDBOX');    (* end of box enclosing whole screen *)

(* put in some white space *)
command ('box height=0.5I');
command ('endbox');
end;
```

APPENDIX B

```
function rtos(const rin:real; frdigs:integer): string(100);
(* this converts a real number to a character string *)
   var cfinal: string(100);
   var cwhole, cfract: string(50);
   var csign: string(1);
   var i, len, adigit, fdigs: integer;
   var r, rwhole, rfract, rtemp: real;

begin
   cfinal := '';
   cwhole := '';
   cfract := '';
   csign := '';
   r := rin;
   fdigs := frdigs;

if r < 0.0
   then begin
        csign := '-';
        r := - r;
        end;

(* say (' truncated number is ' || itos(trunc(r),1)); *)
   cwhole := itos(trunc(r),1);

rfract := r - float(trunc(r));
   if rfract = 0.0
   then cfract := '0'
   else while (rfract -= 0.0) & (fdigs > 0) do
           begin
           rfract := rfract * 10.0;
           adigit := trunc(rfract);
           fdigs := fdigs - 1;
           cfract := cfract || itos(adigit,1);
           rfract := rfract - float(trunc(rfract));
           end;

rtos := cfinal || csign || cwhole || '.' || cfract;
   end;
```

FILE: GSHORT    ICEF    A                    VM/SP CONVERSATIONAL MONITOR SYSTEM

```
:gdoca.
:body col='1'.
:p.
After you have specified the syntax rules, the tag routines, and the
page templates for your new document style, you can mark up your
documents with the tags you have defined, and use ICEF to create
formatted documents in your new style for printing on the 4250 printer.
:figref refid='iceffiles'. shows how the three parts of the style
definition are used by ICEF in the process of translating your
markup file into a formatted document.
.* +++++++++++++++++++++++++++++++++++++++++++++++++++++++++++++++++++
:p.
This paragraph was added 1 August, 1984 to show the use of the
:hp2/screen/ tag. The following text is enclosed in a figure which
is a stylized CRT screen:
:screen.This text is the scope of the screen tag. It should be
surrounded by a nice round-corner rectangle which is as wide as the
column. The rectangle was generated directly from the tag itself, and
does not consist of a separate graphic entity. It has not been
added by manual cut-and-paste.
:p.
This paragraph was added 2 November, 1984 to show the use of the
:hp2/arrow/ tag. Two kinds of arrows are shown below.
:arrow over='0.0I'     down='0.0I'
       shaftl='2.00I'  shaftw='40P'
       headl='0.75I'   headw='80P'
       rotate='0'      textsize='20P'.LOOKIE HERE !!!
:p.
This paragraph was added 2 November, 1984 to show the use of the
:hp2/circle/ tag.
:circle radius='1.5I' over='0.0I' down='0.5I' concat='off'.

DANGER !!!
UNFIT
FOR
HUMAN
USE
:p.
This paragraph was added 3 November, 1984 to show the use of the
:hp2/pointer/ tag which incorporates both an arrow and a circle.
:pointer.
:circle radius='1.0I' over='4.0I' down='0.5I' concat='off'.

DANGER !!!

CONTAINS
ACETONE
:ecircle.
:arrow over='1.0I'     down='1.0I'
       shaftl='2.00I'  shaftw='24P'
       headl='0.75I'   headw='48P'
       rotate='0'      textsize='12P'  pointer='yes'.
LOOK FOR THIS NOTICE
:earrow.
```

APPENDIX C
C. 1/2

```
:epointer.
:p.Here's a rotated arrow.
:arrow over='0.0I'     down='0.5I'
       shaftl='1.50I'  shaftw='0.10I'
       headl='0.50I'   headw='0.30I'
       rotate='20'     textsize='20P'.
.* -----------------------
:importnt.
:imptext.Extreme electrical hazard.
```

```
Disconnect electrical supply and engage safety restraint
before working on this unit.
:arrow over='0.50I'     down='1L'
       shaftl='1.25I'   shaftw='24P'
       headl='0.75I'    headw='48P'
       rotate='0'       textsize='12P'  pointer='yes'.
IMPORTANT !!
:eimportnt.
.* ------------------------
.* ++++++++++++++++++++++++++++++++++++++++++++++++++++++++++++++++++++
:h2.Summary
:p.
The Interactive Composition and Editing Facility, ICEF,
is designed for the creation of
complex documents that contain a variety of materials such as
text in multiple fonts, images, graphics, signatures, letterheads,
logos, tables, and mathematical formulae.  The system improves
the productivity of writers by permitting them to compose and
manipulate all of the these materials on a display, dealing with
an electronic :q"soft copy" of the document until it is ready for
final printing.  Thus ICEF reduces the writer's dependency
on services such as drafting, shortens the cycle of document
preparation, and eliminates the costly step of manual page makeup.
By storing both text and illustrations in digital form, ICEF permits
documents to be printed on demand, at the location where they are
needed, and allows custom versions of a document to be generated for
specific purposes.
:p.
The ICEF user marks up his document with high-level tags that
describe the structure of the document, enabling the system to
automatically resolve page references, create a table of contents,
and generate numbers for figures and lists.
As the user edits his text and markup on an alphanumeric display,
ICEF displays the current formatted page on an attached graphic display.
Thus ICEF combines the advantages of the :q"what you see is what you get"
approach with those of a high-level markup language.
:egdoca.
```

C. 2/2

Having thus described my invention, what I claim as new, and desire to secure by Letters Patent is:

1. A method of generating a graphic figure directly from a declarative tag in a document formatter, comprising the steps of:

composing a document in a markup language, said composed document including a tag for a non-rectangular graphic figure which encloses variable text;

defining said graphic figure to result from an inclusion of said tag;

storing instructions and data representative of said defined graphic figure in a memory unit;

interpreting said composed document, wherein an interpretation of said tag causes the instructions and data representative of said defined graphic figure to be fetched from said memory unit; and formatting said document according to the markup language of said document including the defined graphic figure, the size of said graphic figure being determined by the enclosed variable text at the time said document is formatted.

2. A method as recited in claim 1 wherein said formatted graphic comprises a plurality of visible rectangles each having at least two opposed sides separated by a visually inperceptible distance and said rectangles are spaced to form visually continuous lines.

3. A method of combining text and a grapic illustration enclosing said text in a document formatter, comprising the steps of:

attaching in a markup language a tag, indicating a type of graphic illustration, to a string of text, said graphic illustration being associated with said string of text and the size of said graphic illustration depending upon said string of text;

computing in a document formatting program markup language parameters associated with said string of text;

computing separate portions of said graphic illustration dependent on said parameters associated with said string of text; and using a plurality of said computed portions to generate a graphic illustration enclosing said text in the formatted output of said program.

4. A method as recited in claim 3 wherein each of said marks comprise a visible rectangular figure having a least two opposed sides separated by a visually imperceptible distance and wherein a plurality of said marks are spaced to form visually continuous lines.

5. A document editor comprising:

means for composing a markup language version of a document including a non-rectangular graphic figure represented by a tag, said graphic figure enclosing variable text;

means for defining a representation of said graphic figure, said graphic figure being defined by geometric shape only;

means for storing said representation of said graphic figure;

means for interpreting said composed markup language version and for fetching said stored representation of said graphic figure, when said tag is interpreted, the size of said graphic figure being computed by said means for interpreting as a function of the enclosed variable text; and means for formatting a visual version of said document responsive to said interpreting means.

6. A document editor, as recited in claim 5, wherein said visual version of said document containing said tag comprises a plurality of visible rectangular figures having at least two opposed sides separated by a visually imperceptible distance and being spaced to form visually continuous lines.

7. A document editor as recited in claim 5:
wherein said representation includes executable software commands; and
wherein said formatting means includes means for executing said commands.

8. A document editor as recited in claim 7:
wherein said composing means includes means for associating said tag with a string of text; and
wherein said formatting means formats said visual version with said text enclosed within said graphic figure and wherein the size of said graphic figure depends upon said string of text.

9. A document editor as recited in claim 8, wherein said visual version of said document containing said tag comprises a plurality of visible rectangular figures having at least two opposed sides separated by a visually imperceptible distance and being spaced to form visually continuous lines.

* * * * *